United States Patent [19]

Hirose et al.

[11] Patent Number: 4,770,975
[45] Date of Patent: Sep. 13, 1988

[54] OPTICAL RECORDING MEDIUM

[75] Inventors: Sumio Hirose, Yokohama; Hiroshi Ozawa, Isehara; Kenji Abe; Yoichi Hosono, both of Yokohama, all of Japan

[73] Assignees: Mitsui Toatsu Chemicals, Inc.; Yamamoto Chemicals, Inc., both of Japan

[21] Appl. No.: 135,893

[22] Filed: Dec. 21, 1987

Related U.S. Application Data

[63] Continuation of Ser. No. 818,600, Jan. 10, 1986, abandoned.

[30] Foreign Application Priority Data

Jan. 14, 1985 [JP] Japan .................. 60-4537

[51] Int. Cl.$^4$ .................. G03C 1/72; G03C 1/78
[52] U.S. Cl. .................. 430/271; 430/270;
430/496; 430/495; 430/945; 430/21; 430/269
[58] Field of Search .............. 430/271, 270, 495, 496, 430/945, 21, 269; 346/135.1

[56] References Cited

U.S. PATENT DOCUMENTS

| | | | |
|---|---|---|---|
| 4,458,004 | 7/1984 | Tanikawa | 430/270 |
| 4,492,750 | 1/1985 | Law et al. | 430/269 |
| 4,605,607 | 8/1986 | Nikles et al. | 430/270 |

*Primary Examiner*—Won H. Louie
*Attorney, Agent, or Firm*—McGlew and Tuttle

[57] ABSTRACT

Disclosed herein is an optical recording medium permitting recording and reading-out of signals without any reflective layer. The optical recording medium comprises a transparent substrate and an optical recording layer provided directly on the substrate. The recording layer contains at least 80 wt. % of a naphthalocyanine dye represented by the following general formula (I):

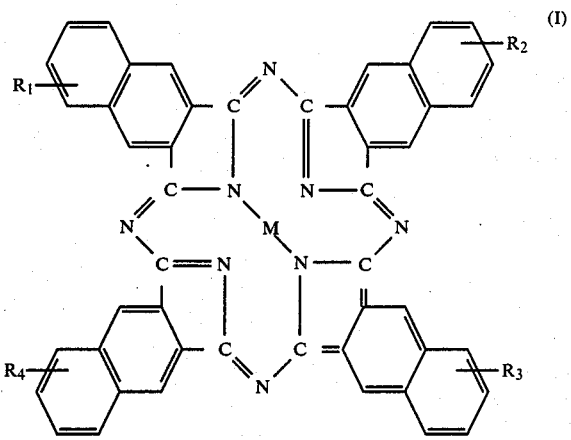

wherein $R_1$, $R_2$, $R_3$ and $R_4$ may be either the same or different and mean individually a straight-chain or branched alkyl group having 5–12 carbon atoms and M denotes a metal or a metal oxide or halide.

8 Claims, 1 Drawing Sheet

WAVELENGTH DEPENDENCY OF TRANSMITTANCE AND REFLECTANCE OF RECORDING LAYER

OPTICAL RECORDING MEDIUM

This is continuation of application Ser. No. 818,600, filed Jan. 10, 1986, now abandoned, of Sumio Hirose et al., for Optical Recording Medium.

BACKGROUND OF THE INVENTION (1) Field of the Invention:

This invention relates to write-once optical recording media, and more specifically to optical recording media useful as external memories for computers and for recording various information such as video and audio information as well as to a method for recording information on the media and reading them out from the media.

(2) Description of the Prior Art

As write-once optical recording media, there have been proposed recording media having inorganic recording layers of thin films of low melting-point metals such as tellurium, tellurium alloys and bismuth alloys, and as disclosed in U.S. Pat. No. 4,298,975 for example, recording media making use of phthaloycine films as recording layers. These recording medium are however accompanied layers. These recording media are however accompanied by a problem in that their manufacture is always low since the formation of their recording layers is conducted in vacuo by vacuum evaporation, sputtering or the like. Furtermore, media having inorganic recording layers are limited in recording density due to the greater thermal conductivity of the recording layers. There is also a potential danger with respect to toxicity since they employ poisonous materials such as tellurium. On the other hand, optical recording media containing phthalocyanine dyes as recording layers usually require a shifting treatment in which recording layers obtained by vacuum evaporation are exposed to heat or vapor of an organic solvent, because the optical characteristics of the recording layers obtained by vacuum evaporation are not sensitive to infrared radiation of semiconductor lasers. This shifting treatment is cumbersome and takes as long as 1 –72 hours. Therefore, these phthalocyanine-containing optical recording media have not yet found actual utility.

With a view toward providing a solution to the above-mentioned problems, optical recording media with recording layers formed by coating soluble organic dyes have been proposed. For example, soluble organic dyes which exhibit absorption in the oscillation wavelength range of semiconductor lasers, such as dithiol metal complexes, polymethine dyes, squarylium dyes and naphthoquinone dyes have been developed and their use in optical recording media is now under investigation.

Optical recording media containing organic dyes as recording layers, which have been proposed to date, additionally required reflective layers made of inorganic materials such as thin metal films or thin metal oxide films because the reflectance of their recording layers is inherently low and shows poor durability. For example, U.S. Pat. No. 4,492,750 relates to media which use alkyl-substituted naphthalocyanine dyes. It discloses an optical recording medium having a reflective layer of a material such as Al provided on a glass or polymethyl methacrylate substrate and a layer of an optical recording composition provided on the reflective layer and containing vapor-treated particles of an alkylsubstituted naphthalocyanine dye, the particle sizes of which range from 0.005 $\mu$m to 0.1 $\mu$m, dispersed in a polymeric binder. As disclosed in the above U.S. patent, the optical recording layer cannot be directly formed on the substrate and the reflective layer made of an inorganic material such as Al must be formed additionally on the substrate by a suitable technique such as vacuum evaporation. The fabrication process of the optical recording medium is thus rather complex. In addition, the above optical recording medium is accompanied by a more serious problem. A recording layer making use of an organic dye has an inherent feature, that is, a low thermal conductivity. Hence, it is potentially expected to exhibit high recording sensitivity. When the recording layer is formed on a reflective layer made of a high thermal-conductivity metal, the thermal energy produced by a writing laser beam irradiated onto the recording layer is however caused to dissipate through the reflective metal layer due to the high thermal conductivity of the reflective metal layer, so that the thermal energy is not effectively used for the formation of pits or holes. As a result, the recording sensitivity is reduced to a considerable extent. When a laser beam is irradiated through the substrate for recording signals or reading them out, the provision of a reflective layer made of an inorganic material such as Al does not allow the laser beam to reach the recording layer even if the substrate per se is transparent. This is obvious because the laser beam is shut off by the reflective metal layer which practically prevents transmission of light therethrough. Whenever such a reflective layer is provided, it is naturally impossible to perform the recording and reading-out of signals through the associated substrate. Accordingly, the recording and reading-out of signals have to be conducted on the side of the recording layer. In this case, the slightest existence of dust or scratches on the surface of the recording layer results in considerable disturbance in the accuracy of the the accurate recording and reading-out of signals which take the form of pits or holes. For practical application, the above-mentioned optical recording medium thus requires a dust protective layer as an overcoat on the recording layer.

If it becomes feasible to conduct the recording and reading-out of signals by means of a laser beam through a transparent substrate, such a dust protective layer will not be required at all because the recording and reading-out of the signals are practically unaffected by the existence of dust or scratches on the medium's surface on the incident side of the laser beam, namely, on the medium's surface where the laser beam has not yet been focused.

As mentioned above, optical recording media with reflective layers made of inorganic materials such as Al are accompanied by numerous drawbacks. It has thus been desired to develop an optical recording medium which permits recording and reading-out of signals without need for a reflective layer made of an inorganic material and has a highly durable recording layer formed by coating an organic dye.

SUMMARY OF THE INVENTION

An object of this invention is to provide an optical recording medium which permits recording and reading of signals without need for any reflective layer.

Another object of this invention is to provide an optical recording medium which owing to the exclusion of the reflective layer, permits recording and reading of signals by a laser beam irradiated through its transparent substrate.

A further object of this invention is to provide an optical recording medium which permits high-sensitivity and high-density recording of signals owing to the direct provision of a recording layer, which is formed of an organic dye in the form of a film, on the substrate without any interposition of a reflective layer.

A still further object of this invention is to provide an optical recording medium which has a recording layer formed of an organic dye in the form of a film and enjoys high stability to heat and moisture and good long-term durability.

A still further object of this invention is to provide an optical recording medium with a recording layer which can be formed by a coating technique without relying upon any irksome technique such as vacuum evaporation.

Other objects of this invention will become apparent from the following description.

The above and other objects of this invention can be attained by the following optical recording medium:

An optical recording medium which permits the recording and reading-out of signals without any reflective layer, comprising a transparent substrate and an optical recording layer provided directly on the substrate, said recording layer containing at least 80 wt.% of a naphthalocyanine dye represented by the following general formula (I):

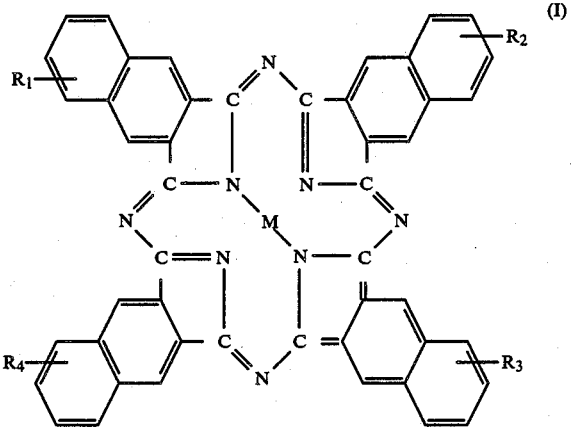

wherein $R_1, R_2, R_3, R_4$ may be either the same or different and represent individually a straight-chain or branched alkyl group having 5–12 carbon atoms and M denotes a metal, a metal oxide or a metal halide.

DETAILED DESCRIPTION OF THE INVENTION

Figure 1:
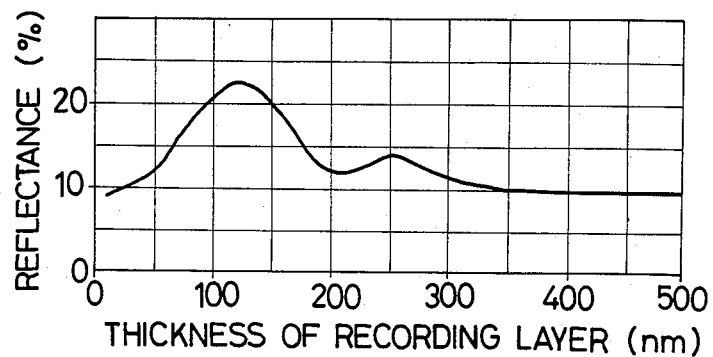
FIG. 1 is a graph showing the thickness dependency of the reflectance of a recording layer according to this invention upon irradiation of light of 830 nm through its associated substrate. When the light is irradiated through the substrate, its reflection takes place at the interface between the substrate and recording layer and also at the interface between the recording layer and air. These two rays of reflected light interfere each other. Therefore, the reflectance of the recording layer varies depending on its thickness as illustrated in FIG. 1. It is hence possible to obtain a large reflectance by making a suitable selection as to the thickness of the recording layer.

As the transparent substrate useful in the optical recording medium of this invention, it is desirable to employ a substrate having a light transmittance of 85% or higher and little optical anisotropy because the write-in and read-out of signals are effected therethrough. Illustrative examples of preferred materials include plastics such as acrylic resins, polycarbonate resins, allyl resins, polyester resins, polyamide resins, vinyl chloride resins, polyvinyl ester resins, epoxy resins and polyolefin resins as well as glass. Among these materials, plastics are particularly preferred in view of the mechanical strength of resulting substrates, the readiness in forming pregrooves and recording address signals, and their economical advantage.

These transparent substrates may take either plate-like or film-like forms. They may also be in the form of either disks or cards. Needless to say, they may contain in the surfaces thereof pregrooves indicative of recording positions, pits or holes for address signals, etc. Such pregrooves and pits or holes for address signals may be applied upon formation the substrates and then exposing the coated sides to ultraviolet rays through their corresponding stampers.

In the present invention, a recording layer containing a naphthalocyanine dye represented by the following general formula (I) is provided on such a substrate.

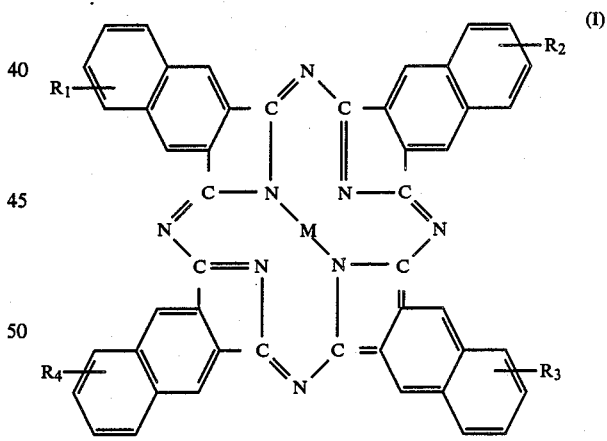

wherein $R_1$, $R_2$, $R_3$ and $R_4$ may be either the same or different and represent individually a straight-chain or branched alkyl group having 5–12 carbon atoms and M denotes a metal, a metal oxide or a metal halide.

As specific examples of the alkyl-substituted group represented by each of $R_1$, $R_2$, $R_3$ and $R_4$ in the naphthalocyanine dye represented by the general formula (I), may be mentioned n-amyl, iso-amyl, sec-amyl, tert-amyl, n-hexyl, iso-hexyl, 1-methyl-1-ethylpropyl, 1,1-dimethylbutyl, n-heptyl, tert-heptyl, octyl, 2-ethylhexyl, nonyl, decyl, dodecyl and so on. These alkyl substituent groups may individually be bonded to either the 5-position, 6-position, 7-position or 8-position of each naphthalene nucleus of the naphthalocyanine. The four alkyl substituent groups may be different. On the other hand, specific examples of M in the naphthalocyanine dye represented by the general formula (I) may include metals such as Cu, Ni, Mg, Pd, V, Co, Ti, Nb, Al, Sn, In, Fe, Cr, Ge, Mn, Mo, Ga, Ca, Sr, Ba, Pb, Sb, Tl, Ta and the like as well as their oxides, chlorides, bromides and iodides. Although these metals and metal oxides, chlorides, bromides and iodides are generally divalent, they may take single valency and triple valency in combination.

Where one or more of the alkyl substitutent groups in the naphthalocyanine dye of the general formula (I) contain 4 or less carbon atoms only, the naphthalocyanine dye has low solubility in a usual solvent such as benzene. It is thus difficult to fix (i.e., form) a recording layer by a coating technique which is the easiest method. Therefore, it is not preferred to use such a naphthalocyanine dye. In view of the solubility in a solvent, each alkyl group preferably contains 5 or more carbon atoms. However, an alkyl group having more than 12 carbon atoms is not preferred because the reflectance of a recording layer containing the corresponding naphthalocyanine dye is small.

From the standpoints of reflectance and absorbance, the particularly preferred M in the naphthalocyanine dye are Cu, Ni, Mg, Pd, Pb, Co, Nb, NbO, Sn, In, InCl, Ge, Ga, Tl, VO (vanadyl), TaO, AlCl or FeCl. The naphthalocyanine dyes of the general formula (I) may be used either singly or in combination.

Incidentally, the above-described naphthalocyanine dyes useful in the practice of this invention can be easily synthesized by processes known per se in the art, such as those described in Zh. Obs. Khim, 42, 696-699 (1972), etc.

In order to fix (form) a recording layer on a transparent substrate for the fabrication of an optical recording medium of this invention, it is possible to use a fix the above-described naphthalocyanine dye by a suitable technique such as vacuum evaporation, sputtering or ion plating. These techniques are however irksome to practice and inferior in productivity. Hence, it is most preferable to effect it by the so-called coating method.

For fixing the recording layer by the coating method, it is necessary to bring a dye formulation formed of one of the above-mentioned naphthalocyanine dyes and an organic solvent into contact with the substrate so that the dye is fixed on the substrate. More specifically, this may be done, for example, by causing the dye formulation to flow down over the substrate or bringing one side of the substrate into contact with the surface of the dye formulation and then pulling it up from the dye formulation, followed by spinning of the substrate to remove any excess formulation or by casting the dye formulation over the substrate while rotating the substrate. Subsequently, the thus-applied recording layer may be forcedly dried if necessary. The organic solvent useful in the formation of the above-mentioned dye formulation may be a solvent which is routinely employed to dissolve such naphthalocyanine dyes. Examples are benzene, toluene, xylene, ethylbenzene, methyl ethyl ketone, methyl isobutyl ketone, cyclohexanone, acetylacetone, ethyl acetate, butyl acetate, amyl acetate, cellosolve, methyl cellosolve, butyl cellosolve, cellosolve acetate, diglime, chloroform, carbon tetrachloride, methylene chloride, methylchloroform, trichlene, dimethylformamide or the like. Upon choosing the solvent, it is preferred to employ such a solvent that has high solubility for the dyes and needless to say, does not damage the pregroove and the like on each transparent substrate. Among the above-mentioned solvents, chloroform, carbon tetrachloride, methyl chloroform, trichlene and the like are particularly preferred.

In the present invention, the concentration of the dye formulation may generally be 0.1-10 wt. % or preferably 0.3-5 wt. % although it may vary depending on the solvent and coating technique. For preparation of the dye formulation, it may be possible to use a soluble resin such as nitrocellulose, ethylcellulose, an acrylic resin, polystyrene, a vinyl chloride-vinyl acetate copolymer, polyvinyl acetate, polyvinyl butyral or a polyester resin as a binder for the dye, and other dyes so as to improve the sensitivity of the recording layer, which dyes may include already-known dyes, for example, aromatic and unsaturated aliphatic diamine metal complexes, aromatic and unsaturated aliphatic dithiol metal complexes, squarylium dyes, naphthoquinon complexes, anthraquinone dyes, polymethine dyes, etc., as well as additives such as levelling agents and defoaming agents. An incorporation of a resin component and/or other dyes and/or additives in such a total proportion as exceeding 20 wt. % in a resulting recording layer will however result in a significant reduction in the reflectance of the resulting recording layer. This will be demonstrated in Examples and Comparative Examples later. It is therefore preferred to limit the total proportion of such resin component and/or other dyes and/or additives below 20 wt.% in the recording layer. In other words, the proportion of the naphthalocyanine dye in the recording layer of this invention is at least 80 wt. % and up to 100 wt. %, preferably 90 wt. % -100 wt. %, and more preferably 95 wt. % -100 wt. %.

When the other dyes as above mentioned are added, it is of course necessary to choose a solvent which can dissolve both the additional dyes and the naphthalocyanine dyes of this invention. Care must also be taken to avoid any significant reduction in the reflectance of the resulting recording layer. From the standpoint of the possible reduction in reflectance, it is preferred to select a polymethine-type dye or naphthoquinone-containing complex.

In the optical recording medium of this invention, it is preferred to conduct the recording and reading-out of signals by a laser beam through the transparent substrate (i.e., laser beam irradiated through the substrate). In this case, if the recording layer becomes too thick, the writing laser beam is absorbed as it passes through the thick recording layer. As a result, the writing laser beam undergoes substantial attenuation and cannot sufficiently reach the surface of the recording layer at which surface the recording layer is in contact with air. The light quantity on the surface is hence insufficient, thereby failing to form pits or holes satisfactorily in accordance with signals. As a result, the sensitivity is reduced and even if recording is barely feasible, the S/N ratio (signal-to-noise ratio) is too small for the reading out signals to render the recording medium suitable for practical application.

When the recording layer is unduly thin, it is impossible to achieve sufficiently high reflectance on the recording layer due to interference of light as will be discussed herein. Hence, no large S/N ratio can be obtained.

It is therefore necessary to form the recording layer with a suitable thickness. In the optical recording layer of this invention, the thickness of the recording layer may preferably be 50–400 nm or more preferably 60–250 nm as an approximate standard.

There are various methods for the measurement of the thickness of layers. It is however very difficult to determine accurate thicknesses by measurement. In practice, it is preferred to use values obtained by using an Ellipsometer. Measurements become particularly difficult when pregrooves are formed in substrates. In this case, the measurement can be substituted by determining the thickness of the layer that has been obtained by fixing the same dye on a substrate of the same type without pregrooves.

The principal feature of this invention resides in that the thus-formed recording layer has a high reflectance by itself. Hence, the recording layer is also automatically equipped with the function of a reflective layer.

Unlike conventional optical recording media using an organic dye as recording layer, the optical recording medium of this invention permits the focal point control of a laser beam and the track control of signal-writing positions for recording signals or reading them out without need for any separate reflective layer such as thin metal layer or thin metal oxide or metal alloy layer.

In order to write signals in an optical recording medium, it is usually necessary to irradiate a laser beam focused on its recording layer. Since the dye in the recording layer absorbs the laser beam and produces thermal energy at the irradiated spot, pits or holes are formed in the recording layer and the reflectance of the recording layer is changed by the formation of said pits or holes. Signals can be read out by detecting the changes in reflectance by means of a weaker laser beam. If these variations in reflectance are small, the signal-to-noise ratio (S/N ratio) is generally small. This is certainly not preferred. Here, it is noteworthy to observe that the mode of variations in reflectance of an optical recording medium upon performing recording thereon, namely, the mode of variations in reflectance upon formation of pits or holes varies considerably depending on the structure of the recording layer of the optical recording medium. In the case of a double-layered medium composed of a light-reflecting layer and light-absorbing layer such as that disclosed in U.S. Patent No. 4,219,826, a reflective layer which has previously been covered by the light-absorbing layer is exposed upon formation of pits or holes in the light-absorbing layer. After the recording, the reflectance has thus been increased at those spots which correspond to pits or holes. In such a case, it is sufficient for the initial reflectance (i.e., the reflectance prior to the formation of pits or holes) to be approximately of such a level that permits control of a laser beam. On the other hand, in a so-called single-layered optical recording medium in which no reflective layer is contained and the recording layer serves not only as a light-reflecting layer but also as light-absorbing layer as in the present invention, the above description must be reversed completely. By the formation of pits or holes, the reflectance of the recording layer is lowered there. Namely, the reflectance of the recording layer where pits or holes are formed becomes lower than the inherent reflectance. For obtaining a large S/N ratio under the above situation, the reflectance through its associated substrate is at least 10% or preferably 15% or higher in a state prior to writing signals thereon. This reflectance of at least 10% or preferably 15% or higher can be easily achieved by using the dye of this invention and suitably selecting the thickness of the recording layer as provided in the present invention. However, the reflectance changes depending on the thickness of the recording layer due to the interference of light reflected at both front and back surfaces of the recording layer.

FIG. 1 illustrates, by way of example, results obtained when the present inventors measured the relation of layer thickness and reflectance by using a film formed substantially of tetra-6-tert-amyl-2,3-naphthalocyaninevanadyl only. In this case, the measurement of reflectance was conducted by using a light source of the wavelength of 830 nm, fixing a recording layer on a transparent substrate free of pits or holes such as pregrooves and measuring the reflectance through the transparent substrate by means of a spectrophotometer equipped with a 5° regular reflection accessory. The term "reflectance" as used herein shall be considered to mean a value measured in the above manner.

Figure 2:
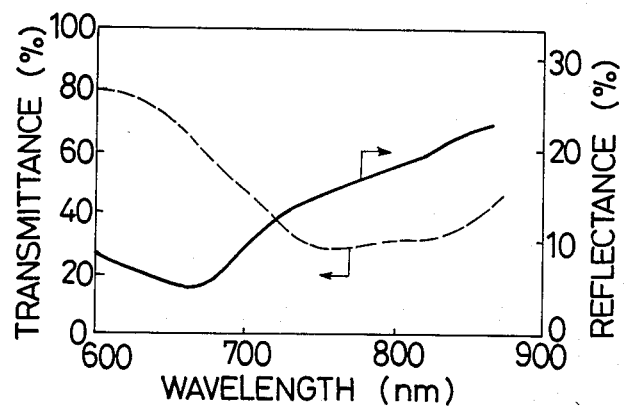
FIG. 2 diagrammatically illustrates the wavelength dependency of the transmittance and reflectance of a recording layer according to this invention. The recording layer of this invention has a broad absorption in the wavelength range of 730–870 nm. This absorbing wavelength range is in good conformity with the oscillation wavelengths of semiconductor lasers. The reflectance in this wavelength range is also 15–23%.

FIG. 2 shows the wavelength dependency of the reflectance and transmittance of a recording layer obtained by coating tetra-6-tert-amyl-2,3-naphthalocyaninevanadyl to a thickness of 110 nm on a smooth acrylic resin substrate 1.2 mm thick. The reflectance and transmittance were measured through the acrylic resin substrate. As apparent from FIG. 2, it is understood that the recording layer has large absorption and reflectance in the oscillation wavelength range of laser beams even when it has not been vapor-treated.

When a polymeric binder is contained in a large proportion of 40–99 wt. % or preferably 60–99 wt. % as disclosed in U.S. Patent No. 4,492,750, the associated dye is not evenly dissolved in the binder and particles of the dye are in a state of dispersion therein. Thus, the spectroscopic characteristics of the dye do not match the oscillation wavelength of a laser beam unless the dye particles are vapor-treated. Where the proportion of the resinous binder is in a far smaller proportion of from 0 wt. % (inclusive) to 20 wt. % (exclusive) as in the present invention, the present inventors have unexpectedly found that large absorption takes place in the oscillation wavelength range of laser beams without need for vapor treatment even if the same dye is employed. Although the reasons for the above phenomenon have not been fully elucidated, the state of intermolecular association of the dye or its crystalline structure appears to change considerably depending on the amount of the associated polymeric binder.

Another feature of this invention resides in the possibility of formation of a recording layer by practically the even single use of the naphthalocyanine dye without practically using any resinous binder.

When a layer formed singly of an organic dye is prepared by vacuum evaporation or the like, the resultant layer is usually inferior in mechanical properties. For this reason, a resin has heretofore been added as a binder in a large amount to the organic dye to improve the mechanical properties of the resulting dye layer. The specific dyes of this invention or correctly speaking, recording layers formed practically of the naphthalocyanine dyes alone have been found to have sufficient mechanical properties in spite of the inclusion of a binder in far smaller amounts or the exclusion of such a binder, so that they can be successfully used as optical recording media.

When the optical recording medium of this invention is used, it may be feasible to provide an anti-reflecting layer to improve its S/N ratio. Further, to protect the recording layer, it may be feasible to coat a u.v. curable resin on the recording layer or to apply a protective sheet on the surface of the recording layer or to bond two optical recording media with their recording layers facing each other inside. When two optical recording media are bonded to each other, it is desirable to bond them together with an air gap left between their recording layers.

By the way, the laser beam useful in recording or reading out in the present invention is a semiconductor laser beam having an oscillation wavelength in the range of 730–870 nm or preferably 750–860 nm. When recording is made at 5 m/s for example, the laser output on the surface of the substrate may be about 4 mW –12 mW or so. The reading output may be about one tenth the output of the laser beam upon recording and may thus be about 0.4–1.2 mW or so.

Certain preferred embodiments of this invention will hereinafter be described by the following Examples.

EXAMPLE 1

(1) After a liquid formulation consisting of 1 part by weight of tetra-6-tert-heptyl-2,3-naphthalocyaninevanadyl dye and 99 parts of chloroform was dripped to a central part of an acrylic resin plate having a thickness of 1.25 mm and a diameter of 200 mm, the acrylic resin plate was spun for 15 seconds at a spin rate of 2000 rpm. The acrylic resin plate was then dried for 10 minutes at a temperature of 40° C. to fix a recording layer, which consisted practically of tetra-6-tert-heptyl-2,3-naphthalocyaninevanadyl dye only, on the acrylic resin plate. The thickness of the recording layer was found to be 110 nm by a measurement with an Ellipsometer. The reflectance of light having a wavelength of 830 nm through the acrylic resin plate was 21%.

(2) The thus-fabricated optical recording medium was mounted on a turn table with its recording layer facing up. While it was rotated at a spin rate of 900 rpm, pulsated signals of 1 MHz (duty: 50%) were recorded by means of an optical head equipped with a semiconductor laser having an oscillation wavelength of 830 nm and an output of 8 mW on the surface of the substrate. During the recording, the optical head was controlled in such a way that the laser beam was allowed to focus on the recording layer from a point underneath the optical recording medium, namely, from a point on the side of the substrate and through the acrylic resin plate. Thereafter, the above-recorded signals were read-out by using the same apparatus in the same manner except that the output of the semiconductor laser was reduced to 0.7 mW on the surface of the substrate. In the above reading-out, the signal-to-noise ratio (S/N ratio) was 50 dB. Extremely good writing and reading of signals were performed.

(3) In order to investigate the durability of the optical recording medium, it was left over for 4 months at a temperature of 60° C. and 95% R.H. and signals were then recorded in an unrecorded area in the same manner as above. The signals recorded before the durability test and those recorded subsequent to the durability test were read-out respectively. They gave S/N ratios of 48 dB and 49 dB respectively. Thus, the change caused by the durability test was very small.

(4) Furthermore, the shapes of pits at the signal-recorded area were observed by a scanning electron microscope after the durability test. Their shapes were substantially the same as those recorded before the durability test. In the case of an optical recording medium having a thin film of an inorganic material such as Te as a recording layer, swelling takes place along the edges of pits, perhaps, due to the large thermal conductivity of the recording layer. This swelling causes noise. However, such swelling was practically unobserved and the pits maintained very good configurational integrity.

EXAMPLE 2

Optical recording media with recording layers formed practically of naphthalocyanine dyes only were fabricated in the same manner as in Example 1 except that acrylic resin plates having a thickness of 1.2 mm and a diameter of 120 mm were used, naphthalocyanine dyes having the alkyl groups and Ms shown in Table 1 were used, carbon tetrachloride was used as a solvent, and the concentrations of the dyes were changed. The reflectances and S/N ratios of the optical recording media were then measured. Results are summarized in Table 1.

As it is apparent from Table 1, all S/N ratios fell within the range of 48–55 dB in the Invention Example while the S/N ratios were as small as 30 -35 dB in the Reference Example. Since the S/N ratio required usually for an optical recording medium is said to be at least 45 dB, it is understood that the products of the Reference Example are not suitable at all for actual application.

TABLE 1

| Run No. | Naphthalocyanine dye Alkyl group | M | Results Layer thickness* (nm) | Reflectance (%) | S/N (dB) | Remarks |
|---|---|---|---|---|---|---|
| 1 | tert-amyl | Cu | 90 | 20 | 53 | Invention |
| 2 | " | Ni | 150 | 20 | 50 | Example |
| 3 | " | Mg | 70 | 17 | 48 | |
| 4 | " | Pb | 120 | 24 | 55 | |
| 5 | tert/sec-amyl | Ge | 130 | 22 | 55 | |
| 6 | " | AlCl | 130 | 20 | 52 | |
| 7 | " | FeCl | 130 | 22 | 54 | |
| 8 | octyl | FeCl | 220 | 13 | 50 | |
| 9 | dodecyl | FeCl | 150 | 20 | 55 | |
| 10 | tert-amyl | Cu | 40 | 12 | 35 | Reference |
| 11 | " | Cu | 450 | 9 | 30 | Example |

*Measurement data by Ellipsometer.

EXAMPLE 3

In the same manner as in Example 1, a 1 wt. % formulation of tetra-6-tert-amyl-2,3-naphthalocyaninevanadyl in carbon tetrachloride was coated on an acrylic resin plate having a thickness of 1.25 mm and a diameter of 200 mm and defining a spiral pregroove (width: 0.8 μm, depth: 0.07 μm, pitch interval: 2.5 μm) and also on an acrylic resin plate of the same type as the former acrylic resin plate except for the exclusion of the pregroove.

The thus-coated acrylic resin plates were dried to fabricate optical recording media each of which had a recording layer consisting practically of the naphthalocyaninevanadyl dye. In the case of the acrylic resin plate with the pregroove, the recording layer was fixed on the pregroove-defining side. The thickness of the recording layer was 130 nm as measured by an Ellipsometer and its reflectance was 22% (Note: The measurements were made on the optical recording medium obtained from the pregroove-free substrate).

By using these optical recording media, their S/N ratios were measured by writing and reading signals in the same manner as in Example 1. Their durability tests were conducted in the same manner as in Example 1. In addition, their pits were also observed in the same manner as in Example 1. Results are summarized in Table 2.

TABLE 2

| Substrate | Results S/N (dB) | | | Observation by electron microscope |
| --- | --- | --- | --- | --- |
| | Reading-out before durability test | Reading-out after durability test | Reading-out of signals recorded after durability test | |
| With pregroove | 54 | 53 | 52 | No swelling along edges of pits |
| Without pregroove | 52 | 50 | 50 | |

EXAMPLE 4

An optical recording medium was fabricated in the same manner as in Example 1 except that tetra-6-tert-heptyl-2,3-naphthalocyanineindium chloride was used in place of tetra-6-tert-heptyl-2,3-naphthalocyaninevanadyl dye employed in Example 1. The thickness of the resultant recording layer was 100 nm and the reflectance of a semiconductor laser beam having a wavelength of 830 nm was 23%.

Following the procedure of Example 1, evaluation was made on the recording and reading-out of signals. The S/N ratio immediately after the recording was 52 dB, the S/N ratio after the durability test was 50 dB, and the S/N ratio upon recording and reading-out subsequent to the durability test was 51 dB. Thus, the changes in S/N ratio by the durability test were very small. On the other hand, the shapes of pits in a recorded area were observed by a scanning electron microscope and found to be substantially free of swelling along their edges and to have maintained very good configurational integrity.

EXAMPLE 5 & COMPARATIVE EXAMPLE 1

By using acrylic resin plates having a thickness of 1.2 mm and a diameter of 120 mm and carbon tetrachloride solutions composed respectively of tetra-6-tert-hexyl-2,3-naphthalocyaninevanadyl as a dye and binders of the types and amounts given in Table 3, optical recording media were prepared in the same manner as in Example 2. The thicknesses and reflectances of the recording layers are summarized in Table 3. By using these recording media, recording and reading-out of signals were performed in the same manner as in Example 2. Results are also summarized in Table 3.

TABLE 3

| Run No. | Composition of recording layer (wt. parts) | | | Results | | | Remarks |
| --- | --- | --- | --- | --- | --- | --- | --- |
| | Amount of dye | Binder Kind | Amount | Layer thickness (nm) | Reflectance (%) | S/N (dB) | |
| 12 | 95 | Polystyrene | 5 | 90 | 20 | 51 | Invention |
| 13 | 90 | Polystyrene | 10 | 110 | 17 | 49 | Example 5 |
| 14 | 50 | Polystyrene | 50 | 100 | 9 | Unable to record | Comparative Example 1 |
| 15 | 20 | Polystyrene | 80 | 100 | 8 | | |
| 16 | 10 | 83:17 copolymer of vinyl chloride and vinyl acetate | 90 | 110 | 7 | | |

Recording was impossible in Comparative Example 1 (Run Nos. 14–16) of Table 3. It was feasible to control the focal point of the laser beam upon recording and thus pits or holes were formed, but it was not possible read out the signals. Since the amounts of the resinous binders were considerably greater in Comparative Example 1 compared with those in Example 5 of this invention, the initial reflectances were as low as 7–9%. Even if pits or holes were formed, the reductions in the reflectances due to the formation of such pits or holes are believed to be slight. Hence, the resultant changes in reflectance do not appear to be large enough to take them out as signals.

COMPARATIVE EXAMPLE 2

By using a 5% chloroform solution of the same naphthalocyanine dye as that employed in Example 3, an optical recording medium was fabricated in the same manner as in Example 1. The thickness of the recording layer in the thus-obtained optical recording medium was 500 nm. On the other hand, the reflectance was 10%. By using the optical recording medium, recording and reading-out of signals were performed in the same manner as in Example 1 to determine its S/N ratio. The S/N ratio was as small as 30 dB and the noise was large.

COMPARATIVE EXAMPLE 3

After reflective layers of aluminum on acrylic resin plates of the same type as those used in Example 1 by vacuum evaporation were provided, recording layers were formed on the reflective layers by using the same dye solutions as those employed respectively in Example 3 and Comparative Example 2 in the same manner as in Example 1 so that optical recording media were fabricated. The thicknesses of the thus-obtained recording layers were 130 nm and 500 nm respectively. Their reflectance was 27% and 12% respectively. By using these recording media, signals were recorded and read-out in the same manner as in Example 1 except that the semiconductor laser beam was irradiated directly to the recording layers. Their S/N ratios were very small, i.e., 28 dB and 20 dB respectively. Further, the recording spin rate was lowered to 450 rpm and signals were recorded and read-out. Their S/N ratios were improved but were still as small as 40 dB and 30 dB respectively.

It is accordingly understood that the provision of an additional reflective layer of a metal or the like results in a decrease in recording sensitivity due to the high thermal conductivity of the reflective layer and recording of signals is not feasible at a high spin rate and even when recorded at a low spin rate, only extremely small S/N ratios are only available.

As has been described above, the optical recording medium of this invention permits recording and reading of signals without need for a reflective layer such as thin metal film or thin metal oxide film because its recording layer has a sufficient reflectance by itself. Furthermore, owing to its large reflectance, a large S/N ratio can be obtained. Moreover, the optical recording medium of this invention is stable to heat and moisture and is hence usable over a long period of time.

In addition, swelling is not observed at the edges of pits in a recorded area. This indicates that a large S/N ratio can be obtained and at the same time, the recording density can be improved.

What is claimed is:

1. An optical recording medium which permits the recording and reading-out of signals with a laser beam at an oscillation wavelength thereof in the range of 730–870 nm without any reflective layer and comprises a transparent substrate and a vapor-untreated optical recording layer providing directly on said substrate by a solvent coating process, said recording layer containing at least 80 wt. % of a naphthalocyanine dye represented by the general formula

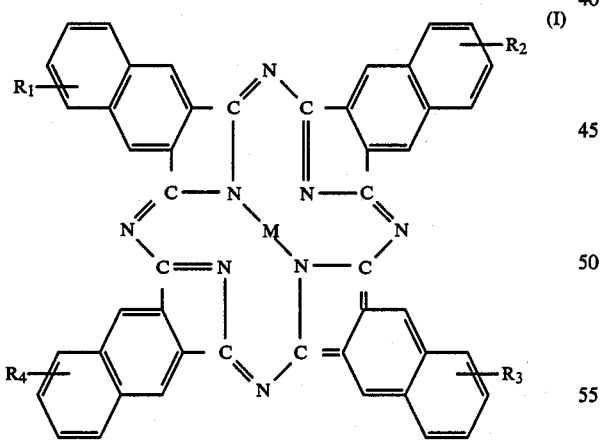

(I)

wherein $R_1$, $R_2$, $R_3$ and $R_4$ are either the same or different and represent a straight chain or a branched alkyl group having 5–12 carbon atoms, and M denotes a metal, a metal oxide or a metal halide, wherein the thickness of said recording layer is 50–400 nm.

2. An optical recording medium, as claimed in claim 1, wherein the thickness of said recording layer is 60–250 nm.

3. An optical recording medium, as claimed in claim 1, wherein said transparent substrate is a transparent plastic substrate.

4. An optical recording medium, as claimed in claim 1, wherein said transparent substrate has a transparency of at least 85%.

5. An optical recording medium, as claimed in claim 1, wherein said M is selected from the group consisting of Cu, Ni, Mg, Pd, Pb, Co, Nb, Sn, In, Ge, Ga, Tl, NbO, TaO, InCl, AlCl, FeCl and VO (vanadyl).

6. An optical recording medium, as claimed in claim 1, wherein said metal halide is a chloride, bromide or iodide.

7. An optical recording medium, as claimed in claim 1, wherein said recording layer contains up to 20 wt. % of a plastic selected from acrylic resins, polycarbonate resins, allyl resins, polyester resins, polyamide resins, vinyl chloride resins, polyvinyl ester resins, epoxy resins and polyolefin resins.

8. A method for recording signals, which comprises:
(a) providing an optical recording medium;
(b) irradiating a convergent semiconductor laser beam through the transparent substrate of said optical recording medium for writing the signals; and
(c) forming pits or holes in the optical recording layer of said optical recording medium in accordance with the signals by the laser beam irradiated through the transparent substrate, which pits or holes can be read out by a laser beam irradiated thereto through the transparent substrate wherein said optical recording medium permits the recording and reading-out of signals with a laser beam at an oscillation wavelength thereof in the range of 730–870 nm without any reflective layer and comprises a transparent substrate and a vapor-untreated optical recording layer provided directly on said substrate by a solvent coating process, said recording layer containing at least 80 wt. % of a naphthalocyanine dye represented by the general formula

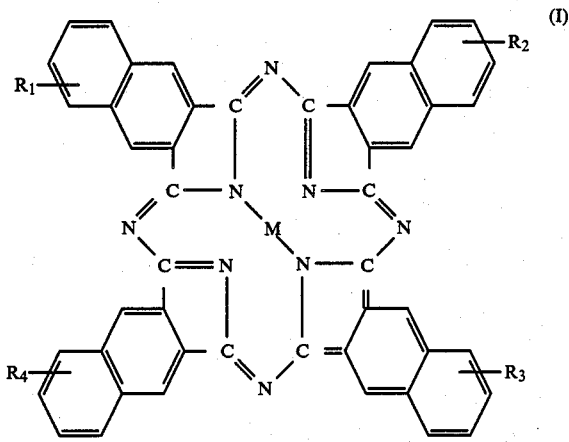

(I)

wherein R1, R2, R3 and R4 are either the same or different and represent a straight chain or a branched alkyl group having 5–12 carbon atoms, and M denotes a metal, a metal oxide or a metal halide.

* * * * *